United States Patent [19]

Finck et al.

[11] 4,242,750
[45] Dec. 30, 1980

[54] PROCESS FOR TESTING A DATA TRANSMISSION SYSTEM EMPLOYING A TEST LOOP

[75] Inventors: Herbert Finck, Wolfratshausen; Konrad Reisinger, Zorneding, both of Fed. Rep. of Germany

[73] Assignee: Siemens Aktiengesellschaft, Berlin & Munich, Fed. Rep. of Germany

[21] Appl. No.: 947,653

[22] Filed: Oct. 2, 1978

[30] Foreign Application Priority Data

Oct. 14, 1977 [DE] Fed. Rep. of Germany ....... 2746337

[51] Int. Cl.³ .......................................... H04L 17/00
[52] U.S. Cl. .................................................. 371/22
[58] Field of Search ............ 340/146.1 E, 146.1 BA; 179/175.3 R, 175.31 R; 324/73 R; 371/22; 370/15

[56] References Cited

U.S. PATENT DOCUMENTS

| | | | |
|---|---|---|---|
| 3,622,877 | 11/1971 | MacDavid et al. | 324/73 R |
| 3,692,964 | 9/1972 | Camiciottoli et al. | 179/175.31 R |
| 3,739,098 | 6/1973 | Camiciottoli et al. | 179/175.31 R |
| 3,950,622 | 4/1976 | Taylor | 179/175.31 R |
| 4,064,459 | 12/1977 | Markwitz et al. | 340/146.1 E |
| 4,112,414 | 9/1978 | Iscol et al. | 340/146.1 E |

*Primary Examiner*—Charles E. Atkinson
*Attorney, Agent, or Firm*—Hill, Van Santen, Steadman, Chiara & Simpson

[57] ABSTRACT

A process for testing a data transmission system by which data are transmitted by way of two data transmission links and by way of a first transmission device and a second transmission device provides that a test loop is closed, in dependence upon a loop signal, and a transmission section is tested. Data are transmitted in data blocks and each block includes a status bit, a synchronizing bit and n data bits. The loop signal is formed from a given combination of the status bit and data bits, and at least one of the data bits is inverted before being returned to the second transmission device.

8 Claims, 6 Drawing Figures

PROCESS FOR TESTING A DATA TRANSMISSION SYSTEM EMPLOYING A TEST LOOP

BACKGROUND OF THE INVENTION

1. Field of the Invention

The present invention relates to a process for testing a data transmission system by which data are transmitted across two data transmission links and across a first transmission device and a second transmission device, in which, in dependence upon a loop signal, a test loop is closed and a transmission section is tested.

2. Description of the Prior Art

In order to test a data transmission system in which data are transmitted by way of two lines across two transmission devices in both directions, a loop signal in the region of the first transmission device could be used to close a test loop so that, on the one hand, the loop signal outgoing from the second transmission device and, on the other hand, the loop signal returned by way of the test loop and the first transmission device, are available in the region of the second transmission device for remote analysis.

It is basically conceivable for the test loops assigned to the individual transmission devices to be controlled by different loop signals so that the return of individual loop signals does not result in the closure of other test loops and does not result in an intercept state in which a loop signal constantly circulates between two transmission devices, and in this manner prevents intended data transmission. Differing loop signals of this kind necessitates a relatively high technical and organizational expense for the production and analysis of the loop signals, so that it appears expedient to operate two transmission devices with the same loop signals, the same loop signal recognition stages and the same fault analysis stages. However, under these conditions, intercept states can occur in which closed line systems, which prevent regular data transmission for an unlimited period of time, form between two transmission devices.

SUMMARY OF THE INVENTION

The object of the present invention is to provide a process for testing a data transmission system employing test loops and similar loop signals which prevents the formation of intercept states.

According to a first embodiment of the invention, prior to being returned to the second transmission device, at least one bit of the loop signal is inverted which is emitted by way of an output of the second transmission device.

Therefore, the returned loop signal is modified and in this manner a test loop of another transmission device is prevented from being closed so that no intercept state can form. Here, the modification of the returned loop signal is effected in dependence upon the theoretical state of the loop signal emitted at the output of the second transmission device. For example, the theoretical state of the loop signal at the output of the second transmission device can be known in the region of the first transmission device by agreement. With this first realization of the object of the invention, the returned loop signal is thus not modified in dependence upon any actually existing loop signal.

According to a second embodiment of the invention, prior to return to the second transmission device, at least one bit of the loop signal is inverted. Here, again, the returned loop signal is modified and in this manner a test loop of another transmission device is prevented from closing so that no intercept state can occur. Here, however, the modification of the transmitted loop signal is not effected in dependence upon a theoretical state of any loop signal, but depends on the loop signal actually received at the input of the first transmission device.

If control bits are to be transmitted in addition to the information bits which form the actual communication, it is advantageous for the items of data to be transmitted in blocks, and per each block to consist of one status bit, one synchronizing bit and n data bits, for the loop signal to be composed of a given combination of the status bit and of the data bits and for at least one of the data bits to be inverted prior to return to the second transmission device.

In order to facilitate a dependable operation of the test loop, even in the event of transmission errors, it is advantageous for the blocks which form the loop signal to be transmitted several times across the second transmission device to the first transmission device, and for a closure command to be produced in the region of the first transmission device if the blocks which form the loop signal are recognized with a given degree of frequency. It is also advantageous for the closure command to serve, on the one hand, to close the test loop and, on the other hand, to modify at least one bit of the loop signal prior to return to the second transmission device. It is further expedient that, in the absence of the blocks which form the loop signal, the loop should not be opened by means of an operating command until the blocks which do not form the loop signal occur with a further given degree of frequency and that the modification which relates to at least one bit should be eliminated.

For an economical execution of the process carried out in accordance with the present invention, it is advantageous to provide a loop recognition stage which contains a decoder which responds to the blocks which form the loop signal. The decoder is operable to emit decoder signals to a counting unit whose count is modified with each decoder signal in one counting direction and, in the absence of the decoder signal assigned to a block, is modified in the opposite counting direction, and which emits the closure command or the opening command when a given first or second count, respectively, has been reached.

BRIEF DESCRIPTION OF THE DRAWINGS

Other objects, features and advantages of the invention, its organization, structure and mode of operation will be best understood from the following detailed description, taken in conjunction with the accompanying drawings, on which.

DESCRIPTION OF THE PREFERRED EMBODIMENTS

Figure 1:
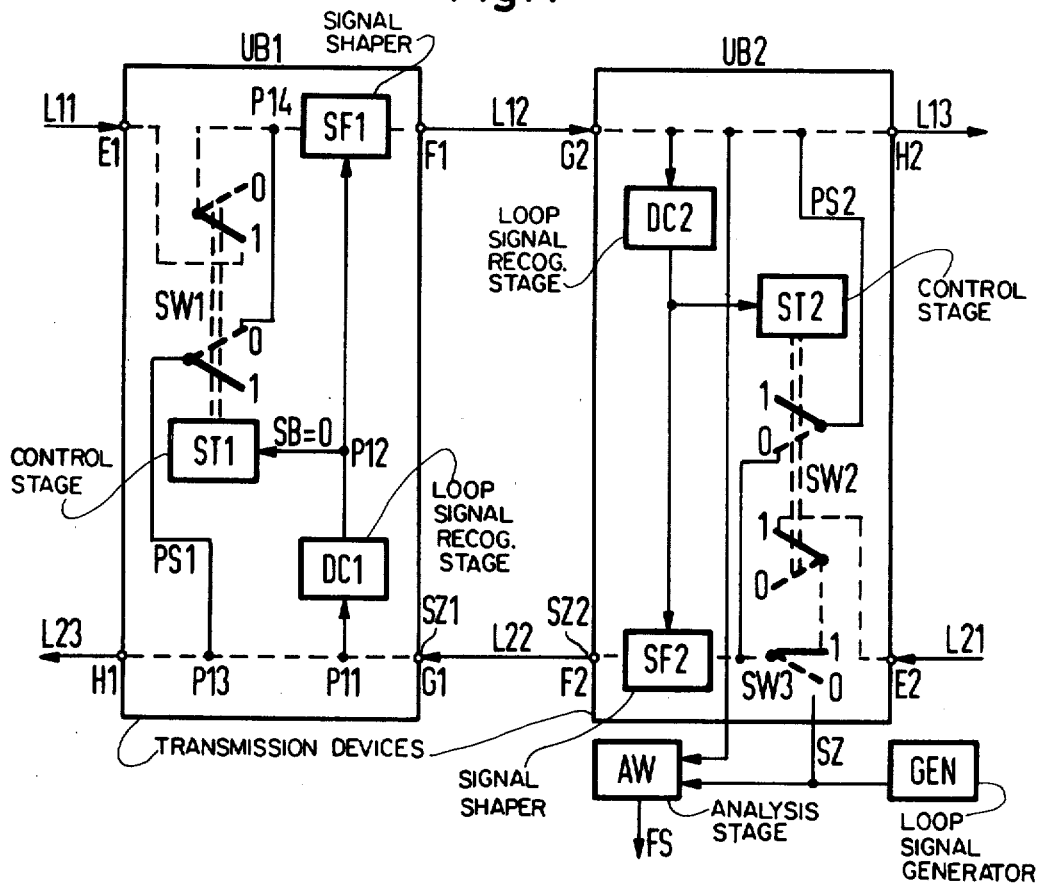
FIG. 1 illustrates in block diagram form, a data transmission system composed of two transmission devices.

FIG. 1 illustrates a first transmission device UB1 and a second transmission device UB2 of similar construction. A pair of lines L11 and L23 are connected to a further data transmission device (not shown) and a pair of lines L13 and L21 are connected to a further data transmission device (also not shown). Therefore the items of data are transmitted in one direction via the lines L11, L12, L13 from one data transmission device to another and in the opposite direction the items of data are transmitted by way of the lines L21, L22 and L23. In place of individual or all of the lines L11, L12, L13, L21, L22, L23 it is possible to provide arbitrary data transmission links, for example also radio transmission links.

The transmission devices UB1 and UB2 can exercise various functions, for example the recognition of signals or the amplification of signals. These functions will not be discussed in detail as they do not form the essence of the invention. However, it will be assumed that the two transmission devices UB1 and UB2 contain loop signal recognition stages DC1 and DC2 which, by integrating analysis, recognize a loop signal which has been transmitted across the lines L22 and L12 even when this loop signal may be subject to faults.

When these loop signal recognition stages DC1 and DC2 recognize the transmission of a loop signal, a closure command SB=0 is emitted which, on the one hand, influences signal shaping stage SF1, SF2, and on the other hand, the control stage ST1, ST2. Then, the assigned switches SW1, SW2 assume their broken-line "0" positions.

When the loop recognition stages DC1 and DC2 do not recognize the transmission of a loop signal, under certain conditions which will be explained hereinbelow, the opening command SB=1 is emitted which, on the one hand, influences the signal shaper stage SF1, SF2 and, on the other hand, the control stage ST1, ST2. Then, the assigned switches SW1, SW2 assume their solid-line "1" positions.

When items of data which represent communications are transmitted by way of the transmission devices UB1 and UB2, the switches SW1, SW2 and SW3 assume their solid-line "1" positions. Then, the data are transmitted in one direction by way of the line L11, the input E1, one of the two switches SW1, the output F1, the line L12, the input G2, the output H2 and a line L13. With this data transmission, the data are not modified by the signal shaping stage SF1. In the opposite direction, the data are transmitted by way of the line L21, the input E2, one of the two switches SW2, the switch SW3, the signal shaping stage SF2, the output F2, the line L22, the input G1, the output H1 and a line L23. Also, in the case the data are not changed by the signal shaping stage SF2 with this mode of operation. The nature of this data transmission is not subject to any special conditions. Therefore, the data can be transmitted synchronously or asynchronously, block-wise or block-free. For example, blocks comprising a specific number of bits and comprising start elements and stop elements can be transmitted. However, the blocks can also consist of individual envelopes as will be explained in more detail with reference to FIGS. 2 and 3.

When the switches SW1 assume their "0" positions, on the one hand a test loop is formed which connects the circuit points P13 and P14 to one another and, on the other hand, the conductive connection of the input E1 to the circuit point P14 is broken. The transmission device UB2 possesses a similar test loop PS2 which is closed in the case of the "0" position of the switch SW2.

Figure 2:
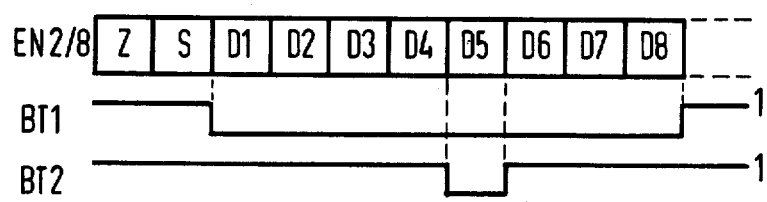
FIGS. 2 and 3 illustrate a plurality of signals on the basis of which the formation of the loop signal will be explained.

In order to explain the operation of the data transmission system in the form of an example, in accordance with FIG. 2 it has been assumed that the items of communication are transmitted in the form of individual blocks. The block EN2/8 illustrated in FIG. 2 contains a status bit Z and, in addition, the synchronizing bit S, which is also referred to as an alignment bit. Then, the block contains the data bits D1, D2, D3, D4, D5, D6, D7 and D8. The block EN2/8 represented in FIG. 2 is followed by further blocks of similar construction. With Z=1, the status bit Z signals that the relevant data bits D1, D8 of the block are information bits of an item of communication. In this case, the items of information are transmitted with the aid of the data bits D1–D8. The synchronizing bits S alternately signal "0" values and "1" values from one block to the next and in this manner allow the individual blocks to be recognized. It will be fundamentally conceivable for the status bit Z, the synchronizing bit S and the data bits D1–D8 to be different distributed within the individual blocks. For example, it would be conceivable for the status bit Z to be followed by the individual data bits D1–D8 and for the synchronizing bit S to be finally transmitted at the end of the individual blocks.

With the status bit Z=0 it is signaled that the relevant block contains control data. Again, in this case the synchronizing bits S alternately assume "0" and "1" values. In this case of Z=0, a special bit combination of the data bits D1–D8 characterizes the loop signal.

In the following, the data transmission process will be described in greater detail under the assumption that the data are transmitted in the form of individual blocks as illustrated in FIG. 2. When the actual items of communication are transmitted, as already mentioned the switches SW1, SW2, SW3 occupy their "1" positions with the status bits Z=1 all the transmission devices UB1, UB2 are informed that this is an item of communication. Therefore, these items of communication are transmitted, on the one hand, via the lines L11, L12, L13 and in the opposite direction via the lines L21, L22, L23.

It will now be assumed that in the region of the transmission device UB2 it is to be checked whether the lines L22 and L12 and the transmission device UB1 are operating correctly. In order to establish this fact, first the switch SW3 is brought into its "0" position either manually or possibly under remote control so that now the loop signal SZ produced by the generator GEN is fed, on the one hand, by way of the line L22 to the loop signal recognition stage DC1 and, on the other hand, is forwarded by way of the line L23. In the present exemplary embodiment it has been assumed that the loop signal SZ is composed of the block EN2/8 with a special bit combination and with Z=0.

The devices connected to the line L23 can now fundamentally recognize that this is not an item of communication to be transmitted, but a loop signal. The loop signal recognition stage DC1 also recognizes the transmitted loop signal from the special bit combination of the bits D1-D8 and from Z=0.

Since an integrating analysis has been assumed, a plurality of such loop signals SZ are consecutively transmitted and if, in spite of any faulty bits which have occurred, the loop signal recognition stage DC1 recognizes a given degree of frequency of the loop signals SZ, a closure command SB=0 is emitted which, on the one hand, sets up the "0" positions of the switches S1 and, on the other hand, activates the signal shaping stage SF1. Therefore, on the one hand, the test loop PS1 is closed so that the loop signal is now fed via the line L22 and via the test loop PS1 to the circuit point P14. On the other hand, the signal shaping stage SF1 is activated in such a manner that prior to the return of the loop signal via the line L12 at least one bit of this loop signal is inverted. By way of the output F1, the input G2 is fed with the signal which differs in a determinate manner from the loop signal at at least one bit position.

If the same loop signal SZ as is transmitted by way of the line L22 were transmitted by way of the line L12, the loop signal recognition stage DC2 would respond in the same manner as the loop signal recognition stage DC1 to the loop signal, and would set the switches SW2 into their "0" positions as a result of which the loop PS2 would be closed in addition to the loop PS1 and an intercept state would arise during which the loop signal SZ would circulate for an indefinite length of time in the lines L12, L22 and in the test loops PS1, PS2 and which would prevent normal data transmission.

This intercept state would remain even when the switch SW3 is returned to its "1" position and the loop signal SZ produced by the generator GEN is no longer fed to the loop signal recognition stage DC1.

The returned loop signal can now be obtained in the following manner. Prior to return by way of the output F1 to the second transmission device UB2, at least one bit of the loop signal can be inverted relative to the corresponding bit of the loop signal SZ2 which is emitted at the output F2 of the second transmission device UB2. In this case, one does not take into account the actual state of the loop signal, however, but the theoretical state of this loop signal SZ2 which is known, for example by agreement, in the region of the signal shaping stage SF1. In a second situation, prior to the return of the second transmission device UB2, at least one bit of the loop signal SZ1 which is actually received at the input G1 of the first transmission device UB1 is inverted. Therefore, this second situation is governed not by the theoretical state of a loop signal, but by the actual state of the actually received loop signal SZ1.

The mode of operation of the signal shaping stage SF1 allows the returned signal to be analyzed by means of an analysis stage AW. This analysis stage AW, on the one hand, receives the loop signal SZ produced by the generator GEN and, on the other hand, the modified loop signal returned by way of the line L12. Since the manner in which the loop signal SZ has been modified is known in the region of the analysis stage AW, this modification can be taken into consideration in the analysis.

When the signal shaping stage SF1 inverts all the bits of the loop signal, for example, for the duration of the test state, the analysis stage AW will signal a faulty bit, by means of a fault signal FS, only when individual bits of the loop signal SC of the returned, modified loop signal possess identical binary values. Even when the signal shaping stage SF1 inverts only individual bits of the loop signal, this can be taken into account correspondingly in the analysis stage AW. As long as the switch SW3 occupies its "0" position, the loop testing is carried out. At the end of loop testing, the switch SW3 is reset to its "1" position so that the transmission of useful information can be restarted.

The loop signal SZ does not necessarily require that it be supplied in the region of the transmission device UB2. Therefore, the switch SW3 could be arranged at a different position in the region of the line L21 so that the loop signals SZ are fed via the line L21 actually during the test state. In these circumstances it will generally be expedient to withdraw the returned loop signals, not between the points G2 and H2, but in the region of the line L13, and supply the same to an analysis stage AW arranged therein.

Figure 3:
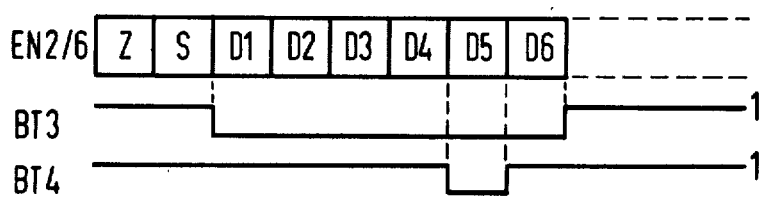

FIG. 3 illustrates the block EN2/6 which contains the status bit Z, the synchronizing bit S and the data bits D1-D6. Here, the same explanations as given in respect of the block EN2/8 fundamentally apply.

Figure 4:
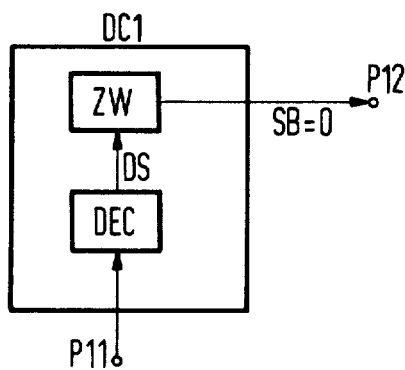
FIG. 4 is a more detailed illustration of a loop signal recognition stage as schematically illustrated in FIG. 1.

FIG. 4 illustrates an exemplary embodiment of the loop signal recognition stage DC1 which has been schematically illustrated in FIG. 1. As described with reference to FIG. 1, the transmitted blocks, for example the transmitted blocks EN2/8, are constantly supplied via the circuit point P11. The decoder DEC decodes a given combination of the status bit Z=0 and of the bits D1-D8. Each time this given combination is recognized, the decoder DEC emits a decoder signal DS to a counting unit ZW whose count is increased by one unit with each decoder signal. It is advantageous for the counting unit ZW to comprise a forward and backward counting counter whose count is reduced whenever the decoder signal DS does not appear in the case of an block. When a plurality of loop signals SZ are transmitted, in spite of any faulty bits, the count of the counting unit ZW will nevertheless increase and reach a given, first count. When this given first count is reached—for example the count of sixteen—a closure command SB=0 is emitted by way of the circuit point P12 and, as already described, on the one hand influences the switches SW1 and, on the other hand, influences the signal shaping stage SF1. When a plurality of loop signals fail to appear, the count is reduced and when a second given count, for example, 1, is reached, an opening command SB=1 is emitted which switches off the signal shaping stage SF1 and brings the switch SW1 into its "1" position. The loop signal recognition stage DC2 is constructed in the same manner as the loop signal recognition stage DC1.

Figure 5:
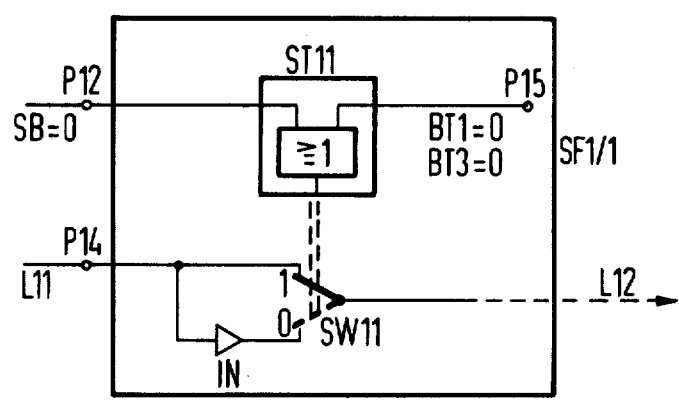
FIG. 5 is a logic diagram of an exemplary embodiment of a signal shaping stage which has been schematically illustrated in FIG. 1 and by means of which all of the data bits are inverted.

FIG. 5 is a more detailed illustration of a first exemplary embodiment SF1/1 of the signal shaping stage SF1 schematically represented in FIG. 1. The switch SW11 is controlled with the aid of the control stage ST11 and assumes its "0" position or "1" position when the control stage 11 emits a "0" signal or a "1" signal, respectively. The control stage 11 can fundamentally consist of an OR gate which at its input is, on the one hand, supplied with the closure command SB=0 by way of the circuit point P12, and, on the hand, is supplied with the signal BT1 by way of the circuit point P15 (see FIG. 2). For such a time as the opening command SB=1 signals that no closure command is present and/or the signal BT1=1, the control stage ST11 emits a "1" signal so that the switch SW11 assumes the solid line switch position and the items of communication are transmitted unchanged by way of the lines L11 and L12. When, however, both the closure command SB=0 and the signal BT1=0 are present, the control stage ST11 emits a "0" signal and the switch SW11 assumes its "0" position in which the supplied bits are inverted with the aid of an inverter IN. As can be seen from FIG. 2, in this case the bits D1–D8 are inverted so that the modified loop signal is composed of the synchronizing bit S and the inverted data bits D1–D8. When block of the type EN2/6 are transmitted, the signal BT3=0 causes the data bits D1–D6 illustrated in FIG. 3 to be inverted before the loop signal is returned via the line L12.

Figure 6:
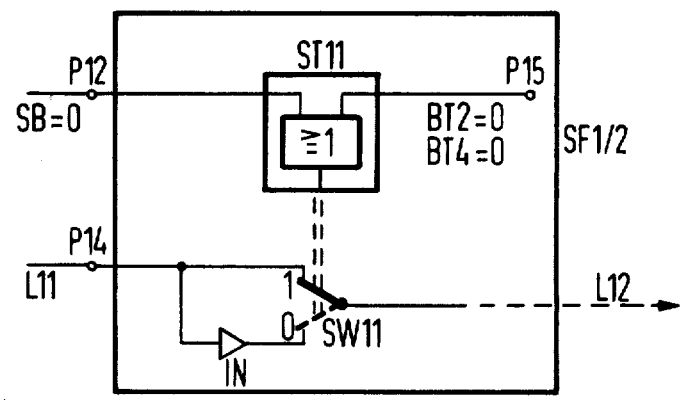
FIG. 6 illustrates a further exemplary embodiment of the signal shaping stage, which has been schematically illustrated in FIG. 1, and by means of which one single data bit is inverted.

FIG. 6 illustrates a second exemplary embodiment SF1/2 of the signal shaping stage SF1 which is schematically represented in FIG. 1. The signal shaping stage represented in FIG. 6 allows the inversion of individual data bits. For example, with the signal BT2=0 in accordance with FIG. 2, the data bit D5 is inverted before the loop signal is returned by way of the line L12. In the case of the block EN2/6, the signal BT4=0 corresponding to FIG. 3 causes the data bit D5 to again be inverted before the loop signal is returned via the line L12. It would be fundamentally conceivable to invert arbitrary other data bits for the formation of the returned loop signal.

Although we have described our invention by reference to particular illustrative embodiments thereof, many changes and modifications may become apparent to those skilled in the art without departing from the spirit and scope of the invention. We therefore, intend to include within the patent warranted hereon all such changes and modifications as may reasonably and preferably be included within the scope of our contribution to the art.

We claim:

1. In a process for testing a data transmission system by which data are transmitted via two transmission links and via first and second transmission devices, and in which a test loop is closed in response to a loop signal and a transmission section is tested, the improvement comprising the steps of:

transmitting a multi-bit loop signal from the second transmission device to the first transmission device; inverting at least one bit of the multi-bit loop signal at the first transmission device to form a modified loop signal; and transmitting the modified loop signal to the second transmission device.

2. The improved process of claim 1, comprising the step of:

forming data in blocks for transmission including a status bit, a synchronizing bit and a plurality of data bits, with the loop signal formed of a predetermined combination of the status and data bits, and wherein the step of inverting at least one of the bits is further defined as inverting at least one of the data bits to form the modified loop signal.

3. The improved process of claim 2, comprising the steps of:

transmitting the blocks a plurality of times; counting the times of occurrence of the blocks at the first transmission device;

closing the test loop in response to counting a first predetermined number of such occurrences; counting the times of expected occurrences of blocks which fail to occur; and opening the test loop in response to a second predetermined number of such failures.

4. The improved process of claim 3, utilizing a loop signal recognition stage including a decoder, and a forward-backward counter connected to the decoder, and comprising the steps of:

decoding the loop signal blocks; operating the counter in one direction in response to each decoder signal assigned to a block; and operating the counter in the opposite direction in response to the failure to appear of each decoder signal assigned to a block.

5. In a process for testing a data transmission system by which data are transmitted via two transmission links and via first and second transmission devices, and in which a test loop is closed in response to a loop signal and a transmission section is tested, the improvement comprising the steps of:

transmitting a multi-bit loop signal from the second transmission device to the first transmission device; receiving the multi-bit loop signal at the first transmission device;

inverting at least one bit of the received multi-bit loop signal at the first transmission device to form a modified loop signal; and transmitting the modified loop signal to the second transmission device.

6. The improved process of claim 5, comprising the step of:

forming data in blocks for transmission including a status bit, a synchronizing bit and a plurality of data bits, with the loop signal formed of a predetermined combination of the status and data bits, and wherein the step of inverting at least one of the bits is further defined as inverting at least one of the data bits to form the modified loop signal.

7. The improved process of claim 6, comprising the steps of:

transmitting the blocks a plurality of times; counting the times of occurrence of the blocks at the first transmission device;

closing the test loop in response to counting a first predetermined number of such occurrences; counting the times of expected occurrences of blocks which fail to occur; and opening the test loop in response to a second predetermined number of such failures.

8. The improved process of claim 7, utilizing a loop recognition stage including a decoder, and a forward-backward counter connected to the decoder, and comprising the steps of:

decoding the loop signal blocks;

operating the counter in one direction in response to each decoder signal assigned to a block; and operating the counter in the opposite direction in response to the failure to appear of each decoder signal assigned to a block.

* * * * *